US011552539B2

(12) United States Patent
Huang et al.

(10) Patent No.: US 11,552,539 B2
(45) Date of Patent: Jan. 10, 2023

(54) ADDITIVELY FORMED ROTOR COMPONENT FOR ELECTRIC MACHINE AND METHOD OF FORMING

(71) Applicant: GE AVIATION SYSTEMS LLC, Grand Rapids, MI (US)

(72) Inventors: Hao Huang, Troy, MI (US); James Patrick Mahle, Dayton, OH (US); Sudeep Pradhan Sadananda Rao, Bangalore (IN); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/377,685

(22) Filed: Jul. 16, 2021

(65) Prior Publication Data
US 2021/0344263 A1 Nov. 4, 2021

Related U.S. Application Data

(63) Continuation of application No. 16/192,143, filed on Nov. 15, 2018, now Pat. No. 11,075,568.

(51) Int. Cl.
| | | |
|---|---|---|
| *H02K 15/02* | (2006.01) | |
| *B22F 5/10* | (2006.01) | |
| *H02K 1/32* | (2006.01) | |
| *B22F 10/20* | (2021.01) | |
| *B33Y 10/00* | (2015.01) | |
| *B33Y 80/00* | (2015.01) | |

(52) U.S. Cl.
CPC ............. *H02K 15/022* (2013.01); *B22F 5/10* (2013.01); *B22F 10/20* (2021.01); *H02K 1/32* (2013.01); *B33Y 10/00* (2014.12); *B33Y 80/00* (2014.12)

(58) Field of Classification Search
CPC .......... B22F 10/20; B22F 10/25; B22F 10/28; B22F 5/10; B33Y 10/00; B33Y 80/00; H02K 1/32; H02K 15/02; H02K 15/022; Y02P 10/25
See application file for complete search history.

(56) References Cited

U.S. PATENT DOCUMENTS

| | | | |
|---|---|---|---|
| 9,419,502 B2 * | 8/2016 | Veronesi | ................ H02K 15/02 |
| 9,919,340 B2 | 3/2018 | Kreidler et al. | |
| 2017/0063183 A1 * | 3/2017 | Shrestha | ................ H02K 15/08 |
| 2017/0155309 A1 * | 6/2017 | Jassal | ......................... B22F 3/24 |
| 2018/0200823 A1 * | 7/2018 | Huang | .................... H02K 5/203 |
| 2018/0205298 A1 * | 7/2018 | Huang | ..................... H02K 1/24 |
| 2018/0233977 A1 | 8/2018 | Volkmuth et al. | |
| 2019/0305616 A1 | 10/2019 | Bittner et al. | |

FOREIGN PATENT DOCUMENTS

EP 3255758 A1 12/2017

* cited by examiner

*Primary Examiner* — Naishadh N Desai
(74) *Attorney, Agent, or Firm* — McGarry Bair PC

(57) ABSTRACT

Disclosed within are a structure and method for forming a component for a rotor to be used in an electric machine. The formed rotor components can include a rotor assembly or rotor shaft. The rotor assembly can include a plurality of poles spaced about a rotor core. The plurality of poles can include a pole shoe or pole body. Quasi-laminations that can result in a unitary structure that includes support structures can be used to form all or a portion of the pole shoe or pole body.

20 Claims, 5 Drawing Sheets

ADDITIVELY FORMED ROTOR COMPONENT FOR ELECTRIC MACHINE AND METHOD OF FORMING

CROSS REFERENCE TO RELATED APPLICATIONS

This application is a continuation of U.S. patent application Ser. No. 16/192,143, filed Nov. 15, 2018, now granted as U.S. Pat. No. 11,075,568, issued on Jul. 27, 2021, the contents of which is incorporated herein by reference in its entirety.

BACKGROUND

Electric machines, such as electric motors or electric generators, are used in energy conversion. Such an electrical machine can include a stator and a rotor. The rotor can be rotated relative to the stator to generate electrical energy or can be rotated relative to the stator as a result of changing magnetic fields induced in windings of the stator. Such electrical machinery can be included in, by way of non-limiting example, a gas turbine engine.

BRIEF DESCRIPTION

Aspects of the disclosure relate to a method for manufacturing a rotor assembly for an electrical machine, the method comprising forming a rotor core, and printing, using additive manufacturing, a plurality of poles, the plurality of poles spaced about the rotor core, each pole of the plurality of poles having a pole body extending from the rotor core towards a pole shoe defining a curved peripheral surface, wherein forming at least a portion of at least one of the plurality of poles comprises forming quasi-laminations that include a first lamination extending along a first axial length, a second lamination extending along a second axial length, wherein the second axial length is spaced from the first axial length by an intermediate axial length, and a set of support structures between the first lamination and the second lamination that span the intermediate axial length and define a set of voids within the at least a portion of the at least one of the plurality of poles.

Aspects of the disclosure also relate to a rotor assembly for an electric machine, comprising a rotor core, and a plurality of poles, the plurality of poles spaced about the rotor core and unitarily formed with the rotor core by printing using additive manufacturing, each pole of the plurality of poles having a pole body extending from the rotor core towards a pole shoe defining a curved peripheral surface, wherein at least a portion of at least one of the pole shoe or the pole body comprises quasi-laminations that include a unitary structure, the unitary structure comprising a first lamination extending along a first axial length, a second lamination extending along a second axial length wherein the second axial length is spaced from the first axial length by an intermediate axial length, and a set of support structures between the first lamination and the second lamination spanning the intermediate axial length and defining voids within the portion of at least one of the pole shoe or the pole body.

DETAILED DESCRIPTION

Figure 1:
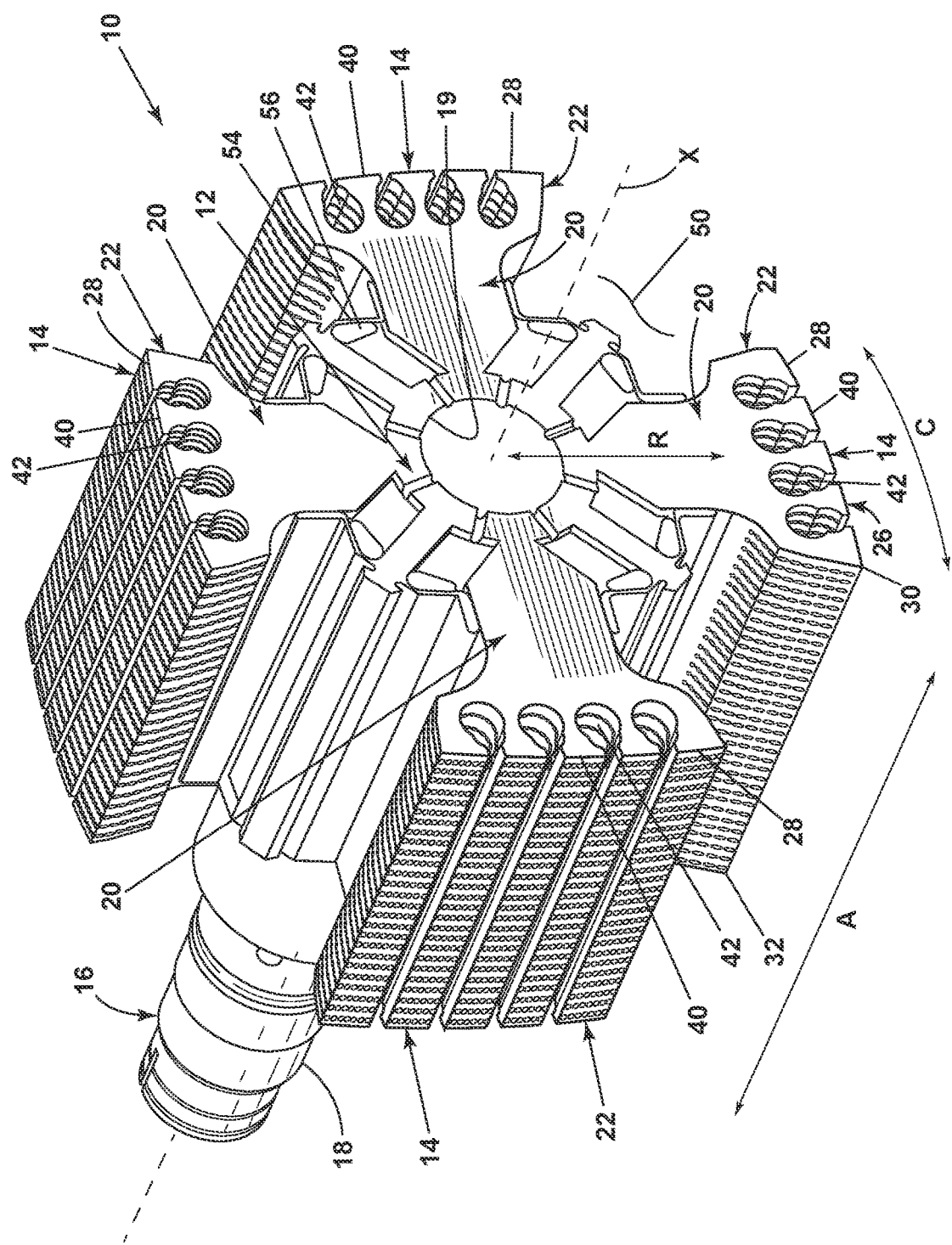
FIG. 1 schematically illustrates a rotor assembly for an electric machine according to aspects disclosed herein.

Conventional methods of manufacturing an electrical machine or components therefore can include, for instance, punching, stamping, or cutting laminations to shape, stacking the oxidized laminations to form a rotor core, winding coils made of insulated wire, inserting slot liners and coils into slots of the rotor core, sliding slot wedges at the top of a slot, forming end turns, shrinking/fitting the rotor core onto a pre-machined shaft, and then performing final machining. While such methods can be used to form satisfactory electric machines and components therefore, such methods can be technically complex, inefficient, and costly.

Therefore, improved methods for manufacturing electric machines that address one or more of the challenges noted above are useful. The present disclosure is related to a method of forming at least portions of a rotor assembly for an electrical machine using a quasi-laminated or quasi-layered structure. Aspects of the disclosure will be described in the context of a turbine engine generator. However, the disclosure is not so limited and aspects described herein can have general applicability, including that the electrical machine can be utilized in any suitable mobile and non-mobile industrial, commercial, and residential applications.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic unitary component, which can have a variety of integral sub-components.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

In addition, one skilled in the art will appreciate that a variety of materials and methods for bonding those materials can be used and are contemplated as within the scope of the present disclosure. As used herein, references to "fusing" can refer to any suitable process for creating a bonded layer of any of the above materials. For example, if an object is made from polymer, fusing can refer to creating a thermoset bond between polymer materials. If the object is epoxy, the bond can be formed by a crosslinking process. If the material is ceramic, the bond can be formed by a sintering process. If the material is powdered metal, the bond can be formed by a melting or sintering process. One skilled in the art will appreciate that other methods of fusing materials to make a component by additive manufacturing are possible, and the presently disclosed subject matter can be practiced with those methods.

In addition, the additive manufacturing process disclosed herein allows a single component to be formed from multiple materials. Thus, the components described herein can be formed from any suitable mixtures of the above materials. For example, a component can include multiple layers, segments, or parts that are formed using different materials, processes, or on different additive manufacturing machines. In this manner, components can be constructed which have different materials and material properties for meeting the demands of any particular application. In addition, although the components described herein are constructed entirely by additive manufacturing processes, it should be appreciated that in additional aspects of the present disclosure, all or a portion of these components can be formed via casting, machining, or any other suitable manufacturing process. Indeed, any suitable combination of materials and manufacturing methods can be used to form these components.

An exemplary additive manufacturing process will now be described. Additive manufacturing processes fabricate components using three-dimensional (3D) information, for example a three-dimensional computer model, of the component. Accordingly, a three-dimensional design model of the component can be defined prior to manufacturing. In this regard, a model or prototype of the component can be scanned to determine the three-dimensional information of the component. As another example, a model of the component can be constructed using a suitable computer aided design (CAD) program to define the three-dimensional design model of the component.

The design model can include 3D numeric coordinates of the entire configuration of the component including both external and internal surfaces of the component. For example, the design model can define the body, the surface, and/or internal passageways such as passageways, voids, support structures, etc. In one exemplary non-limiting example, the three-dimensional design model is converted into a plurality of slices or segments, e.g., along a central (e.g., vertical) axis of the component or any other suitable axis. Each slice can define a thin cross section of the component for a predetermined height of the slice. The plurality of successive cross-sectional slices together form the 3D component. The component is then "built-up" slice-by-slice, or layer-by-layer, until finished.

In this manner, the components described herein can be fabricated using the additive process, or more specifically each layer is successively formed, e.g., by fusing or polymerizing a plastic using laser energy or heat or by sintering or melting metal powder. For example, a particular type of additive manufacturing process can use an energy beam, for example, an electron beam or electromagnetic radiation such as a laser beam, to sinter or melt a powder material. Any suitable laser and laser parameters can be used, including considerations with respect to power, laser beam spot size, and scanning velocity. The build material can be formed by any suitable powder or material selected for enhanced strength, durability, and useful life, particularly at high temperatures.

Each successive layer can be, for example, between about 10 μm and 200 μm, although the thickness can be selected based on any number of parameters and can be any suitable size according to alternative aspects of the present disclosure. Therefore, utilizing the additive formation methods described above, the components described herein can have cross sections as thin as one thickness of an associated powder layer, e.g., 10 μm, utilized during the additive formation process.

In addition, utilizing an additive process, the surface finish and features of the components can vary as need depending on the application. For example, the surface finish can be adjusted (e.g., made smoother or rougher) by selecting appropriate laser scan parameters (e.g., laser power, scan speed, laser focal spot size, etc.) during the additive process, especially in the periphery of a cross-sectional layer, which corresponds to the part surface. For example, a rougher finish can be achieved by increasing laser scan speed or decreasing the size of the melt pool formed, and a smoother finish can be achieved by decreasing laser scan speed or increasing the size of the melt pool formed. The scanning pattern or laser power can also be changed to change the surface finish in a selected area.

Notably, in exemplary non-limiting examples, several features of the components described herein were previously not possible due to manufacturing restraints. However, the present inventors have advantageously utilized current advances in additive manufacturing techniques to develop such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, central, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" or "a plurality of" various elements will be described, it will be understood that "a set" or "a plurality" can include any number of the respective elements, including only one element.

FIG. 1 schematically illustrates an exemplary rotor assembly 10 that can be utilized in any suitable electric machine, by way of non-limiting example and includes beneficial aspects of the present disclosure. The rotor assembly 10 can include a rotor core 12 and a plurality of poles 14, which are part of the rotor core 12 and extend from a central portion thereof. While illustrated, by way of non-limiting example, as having four poles, it is contemplated that the plurality of poles 14 can include any number of poles spaced about the rotor core 12. Only four poles 14 have been shown for the sake of clarity, it will be understood that numerous poles including, by way of non-limiting example, twenty poles can be utilized on the rotor core 12. It will be understood that while the rotor core 12 and the plurality of poles 14 have been identified with different numerals this is by way of designation for clarity and that the rotor core 12 and the plurality of poles 14 are unitarily formed, for example, by additively manufacturing to form a monolithic body.

A rotor shaft 16 can also be unitarily formed with the rotor core 12. By way of non-limiting example, at least a first part 18 of the rotor shaft 16 can be printed using additive manufacturing. It is further contemplated that at least a second part 19 of the rotor shaft 16 can be formed centrally within the rotor core 12. Alternatively, only a portion of the rotor core 12 and the rotor shaft 16 can be unitarily formed as a monolithic body.

Each pole of the plurality of poles 14 can include a pole body 20 extending from the rotor core 12 towards a pole shoe 22. A curved peripheral surface 26 is defined in a circumferential direction C by at an outside edge 28 of the pole shoe 22. Each pole shoe 22 extends between a first end 30 and a second end 32 along an axial direction A. As used herein, the terms "axial" or "axially" refer to a dimension along a longitudinal axis, as illustrated by way of non-limiting example, as the axial direction A along a center longitudinal axis X of the rotor shaft 16 disposed within the rotor assembly 10.

Teeth 40 can be unitarily formed in the pole shoe 22. The outside edge 28 can at least in part define the teeth 40. Gaps 42 can be defined between adjacent teeth 40. The teeth 40 and the gaps 42 can be formed between the first end 30 and the second end 32 along a radial direction R. The illustration if the radial direction R in FIG. 1 is a non-limiting example of radial direction. As used herein, the terms "radial" or "radially" refer to a dimension extending between the center longitudinal axis X, an outer circumference or the outside edge 28, or a circular or annular component disposed thereof, such as, but not limited to the curved peripheral surface 26. Gaps 42 can retain damper bars (not shown), the damper bars and the two end rings (not shown) form a damper winding to help the dynamic performance of the generator of electric machine and shield the harmonics into the core. Usually, the damper bars and the end rings are made of copper.

A rotor slot 50 can be located between two of the plurality of poles 14 spaced about the rotor core 12. The rotor slot 50 can radially extend into a portion of the pole body 20 so that the portion of the pole body 20 partially defines the rotor slot 50. The rotor slot 50 can underlie and be defined by at least a part of the pole shoe 22. As defined by at least a portion or part of the pole body 20 and the pole shoe 22, the rotor slot 50 can extend into the rotor assembly 10 in a direction substantially orthogonal to the axial direction A.

Cooling tubes 54 can be unitarily formed through portions of the rotor core 12. The cooling tubes 54 can be, by additive manufacturing, printed in each layer of the rotor core 12. The cooling tubes 54 can define cooling holes 56. The cooling holes 56 depicted in FIG. 1, as defined by the cooling tubes 54, are printed such that each cooling hole 56 has a teardrop cross section as viewed from the perspective an axial view. The cooling tubes 54 can be proximate the rotor slot 50. The location of the cooling tubes 54 relative to the rotor slot 50 can contribute to the cooling of the rotor windings (not shown in FIG. 1) that can be inserted in the rotor slot 50.

Figure 2:
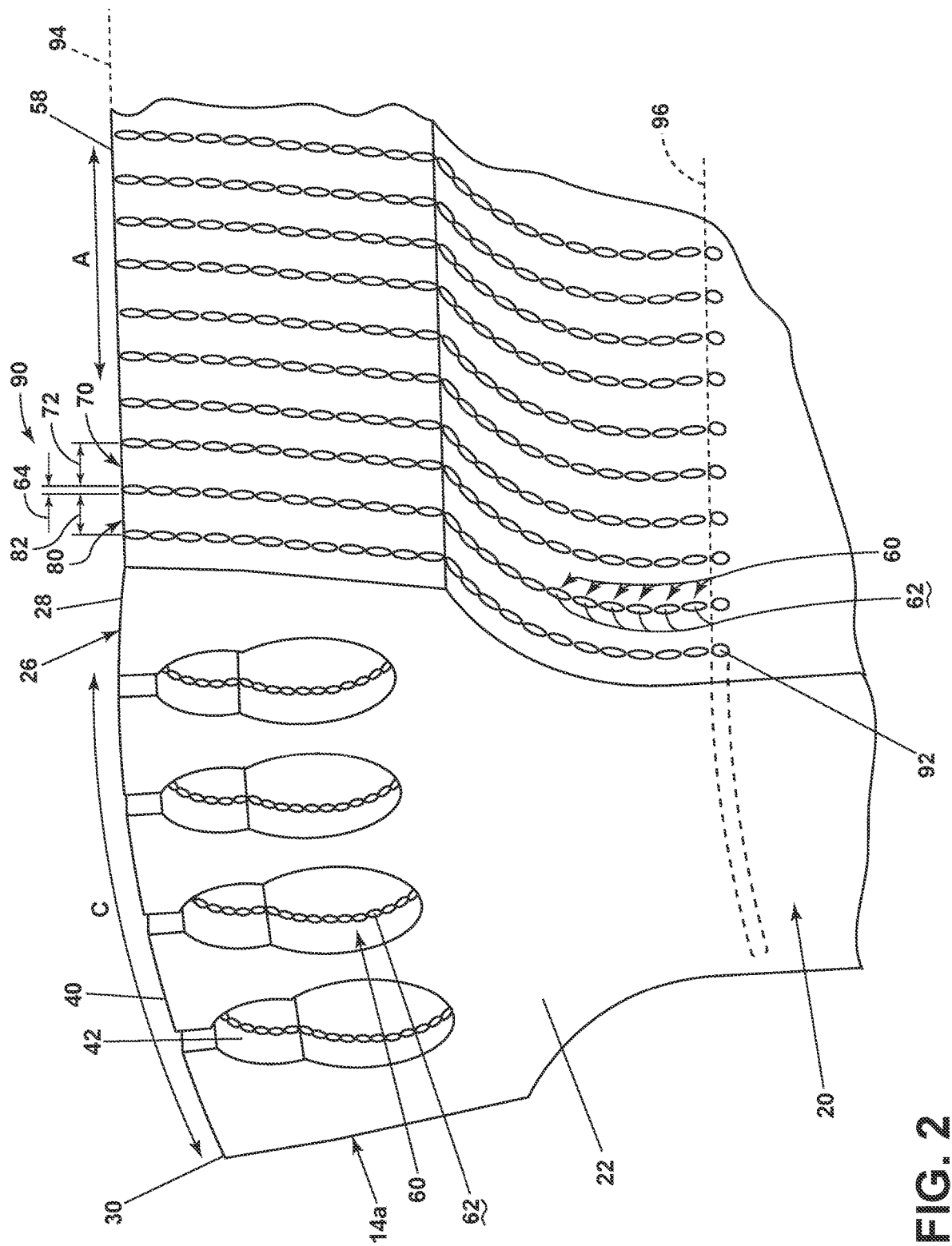
FIG. 2 schematically illustrates a pole of the rotor assembly of FIG. 1, with all other portions of the rotor assembly removed for clarity.

FIG. 2 schematically illustrates one of the plurality of poles 14 of the rotor assembly 10. The pole 14a illustrated in FIG. 2 further clarifies the structure of the pole shoe 22 extending from the pole body 20. As discussed, the rotor assembly 10 can be unitarily formed using additive manufacturing, so that the rotor assembly 10 can be formed by laying laminate layers. The pole shoe 22 and portions of the pole body 20 can be layered so that the unitary formation of the pole shoe 22 includes the teeth 40 that define the gaps 42 by the printing of material or absence of material in a laminate layer 58. The laminate layer 58 is a non-liming example of lamination layers that can be printed using additive manufacturing in a pattern that is relatively orthogonal to the axial direction A. The thickness of the laminate layer 58 can vary based on material and design of the printed rotor assembly 10 component. It will also be understood that while the term layer is user herein that the layer need not be uniform and that the layers need not be completely separate. In this manner, a set of support structures 60 can be formed within the pole shoe 22 between a first lamination 70 and a second lamination 80.

More specifically, the set of support structures 60 within the pole shoe 22 can result from the additive manufacturing process. In this manner, aspects of the present disclosure actually use quasi-laminations to form the pole shoes 22. An example of quasi-laminations, by way of non-limiting example, can include the illustrated first lamination 70 that extends along a first axial length 72, the second lamination 80 that extends along a second axial length 82 and the set of support structures 60. The second axial length 82 is spaced from the first axial length 72 by an intermediate axial length 64. The set of support structures 60 span the intermediate axial length 64. In this manner, the set of support structures 60 link the first lamination 70 and the second lamination 80 such that they form a series of quasi-laminations and a unitary structure 90. Repeating the pattern of lamination layer and support structure layer can result in quasi-laminations defined along at least a portion of an axial length of the at least a portion of the at least one of the pole shoe 22 or the pole body 20. The axial length can be from the first end 30 to the second end 32.

Voids 62 can be defined by two adjacent support structures of the set of support structures 60. The adjacent support structures of the set of support structures 60 that define the voids 62 can extend into the rotor core 12 in the radial direction R.

A first radial location 94 can be located at the curved peripheral surface 26. It is contemplated that the set of support structures 60 and voids 62 can extend through at least a portion of the pole shoe 22 in the radial direction R toward the rotor core 12; terminating at a second radial location 96. That is, the set of support structures 60 and the voids 62 can extend radially from the first radial location 94 to a second radial location 96.

Holes 92 can be defined within the pole 14. The holes 92 can extend through the pole 14a in relatively circumferential direction C that can be substantially orthogonal to both the radial direction R and the axial direction A. The holes 92 can intersect one or more set of support structures 60. The location of the intersection of the holes 92 and the set of support structures 60 can be at the second radial location 96.

Alternatively or additionally, the holes 92 can intercept the set of support structures 60 and voids 62 at a location other than the second radial location 96. It is contemplated that the holes 92 can intersect the set of support structures 60 and voids 62 at any location or direction. It is further contemplated that the pole 14a can include more than one hole 92 through the set of support structures 60. In a non-limiting example, the holes 92 do not penetrate or break any portion of the rotor shaft 16. In another non-limiting example, the holes 92 do not penetrate or break any portion of the gaps 42. In yet another non-limiting example, the holes 92 do not pass through cooling tubes located radially.

Figure 3:
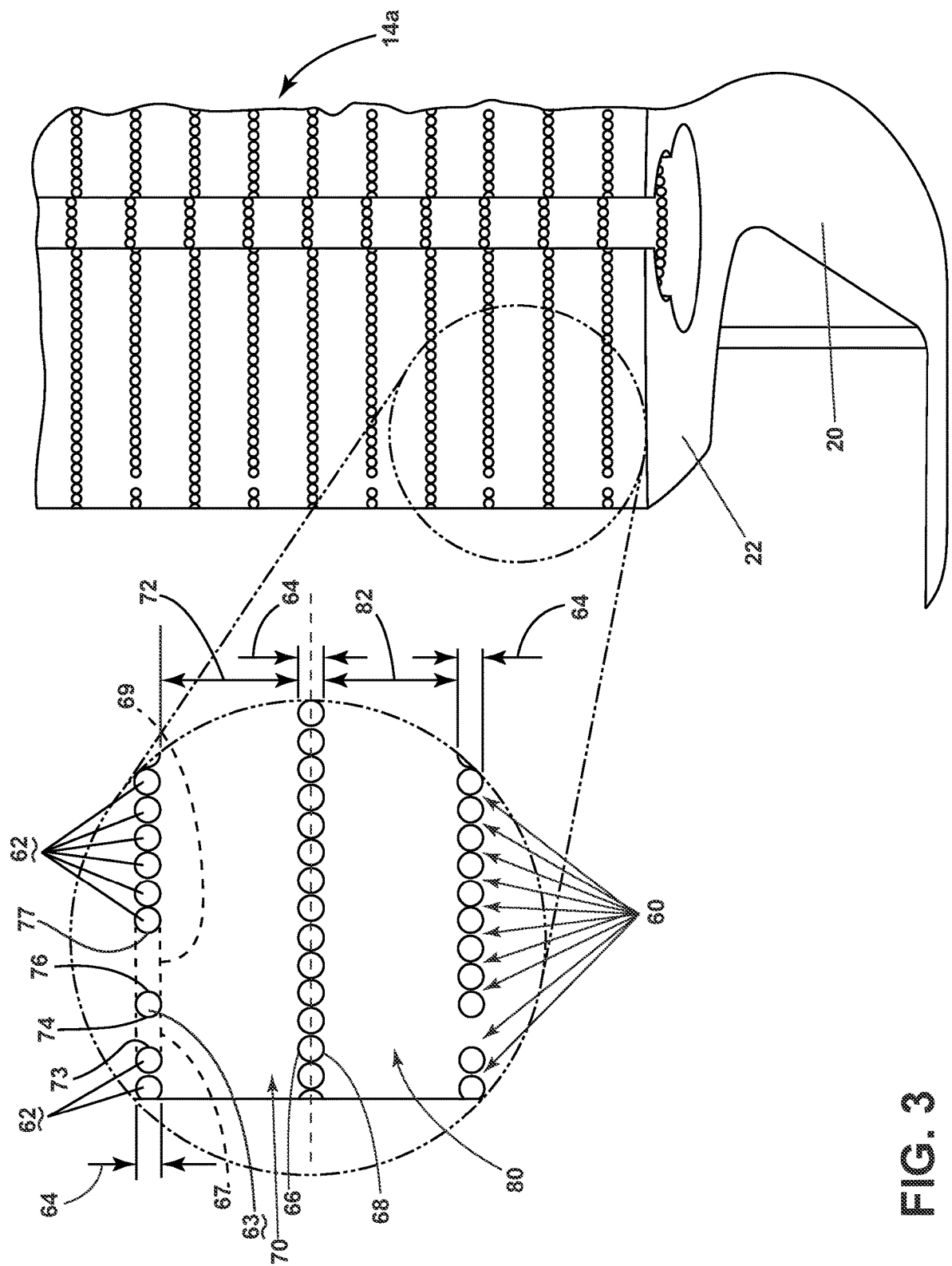
FIG. 3 schematically illustrates a top view of the pole of FIG. 2.

FIG. 3 illustrates a top view of the pole 14a. The top view of the pole 14a provides additional detail to the set of support structures 60 that define the voids 62 that can result from the quasi-lamination formation of the unitary structure 90.

Quasi-laminations can include laminate layers of non-uniformly dispensed material formed between laminate layers of uniformly dispensed material such that the layers are connected instead of spaced apart. For example, by way of non-limiting illustration, the first lamination 70 can include laminate layers of uniformly dispensed material. The uniformly dispensed material laminate layers of the first lamination 70 are laid for the first axial length 72.

The set of support structures 60 can be defined by laminate layers of non-uniformly dispensed material. In layers of non-uniformly dispensed material, there can be locations that receive material and locations that do not receive material. A first arch 66 can result from locations that receive material in the laminate layers of non-uniformly dispensed material. The first arch 66 is unitarily formed to the first lamination 70. Optionally, the first arch 66 can be approximately half of the intermediate axial length 64.

A second arch 68 can result from locations that receive material in the laminate layers of non-uniformly dispensed material. The second arch 68 is unitarily formed to the first arch 66. The first arch 66 and second arch 68 define the set of support structures 60 that span the intermediate axial length 64.

The set of support structures 60 are illustrated, by way of non-limiting example, as circular. The voids 62 defined by two adjacent support structures of the set of support structures 60, can be formed during quasi-lamination as locations that do not receive material in the laminate layers of non-uniformly dispensed material. The voids 62 are illustrated, by way of non-limiting example, as a circle based on the circular shape of the two adjacent support structures of the set of support structures 60 that define the void 62.

The second lamination 80 can include laminate layers of uniformly dispensed material that are formed unitarily to the second arch 68 and can extend the second axial length 82.

By way of additional non-limiting example, a left support structure 67 and a right support structure 69 can alternatively form two adjacent support structures of the set of support structures 60. In the illustrated example, the left support structure 67 and the right support structure 69 span the intermediate axial length 64. The left support structure 67 is defined by a body that spans a predetermined distance between a first arc 73 and a second arc 74. The first arc 73 and the second arc 74 are substantially orthogonal to the first lamination 70 and the second lamination 80. The right support structure 69 is defined by a body that spans a predetermined distance between a third arc 76 and a fourth arc 77. The third arc 76 and the fourth arc 77 are substantially orthogonal to the first lamination 70 and the second lamination 80. Both the bodies of the of the left support structure 67 and the right support structure 69 span between the first lamination 70 and the second lamination 80. The placement of the left support structure 67 and the right support structure 69 effectively forms a void 63 there between. The void 63 is similar in shape to the void 62, although this need not be the case. As with the support structures described above, the left support structure 67 and the right support structure 69 are unitarily formed with the first lamination 70 and the second lamination 80 to form quasi laminations.

By way of non-limiting example, the intermediate axial length 64 of the set of support structures 60 can be a maximum of 0.005 inches (0.127 millimeters) or less. The first axial length 72 of the first lamination 70 can be a maximum 0.030 inches (0.762 millimeters) or less. The second axial length 82 of the second lamination 80 can be 0.030 inches (0.762 millimeters) or less.

It is contemplated that at a least a portion of the first lamination 70 or the second lamination 80 can be formed from by laminate layers of non-uniformly dispensed material. It is further contemplated that the thickness or shape of the first lamination 70, the set of support structures 60, or the second lamination 80 can vary.

Figure 4:
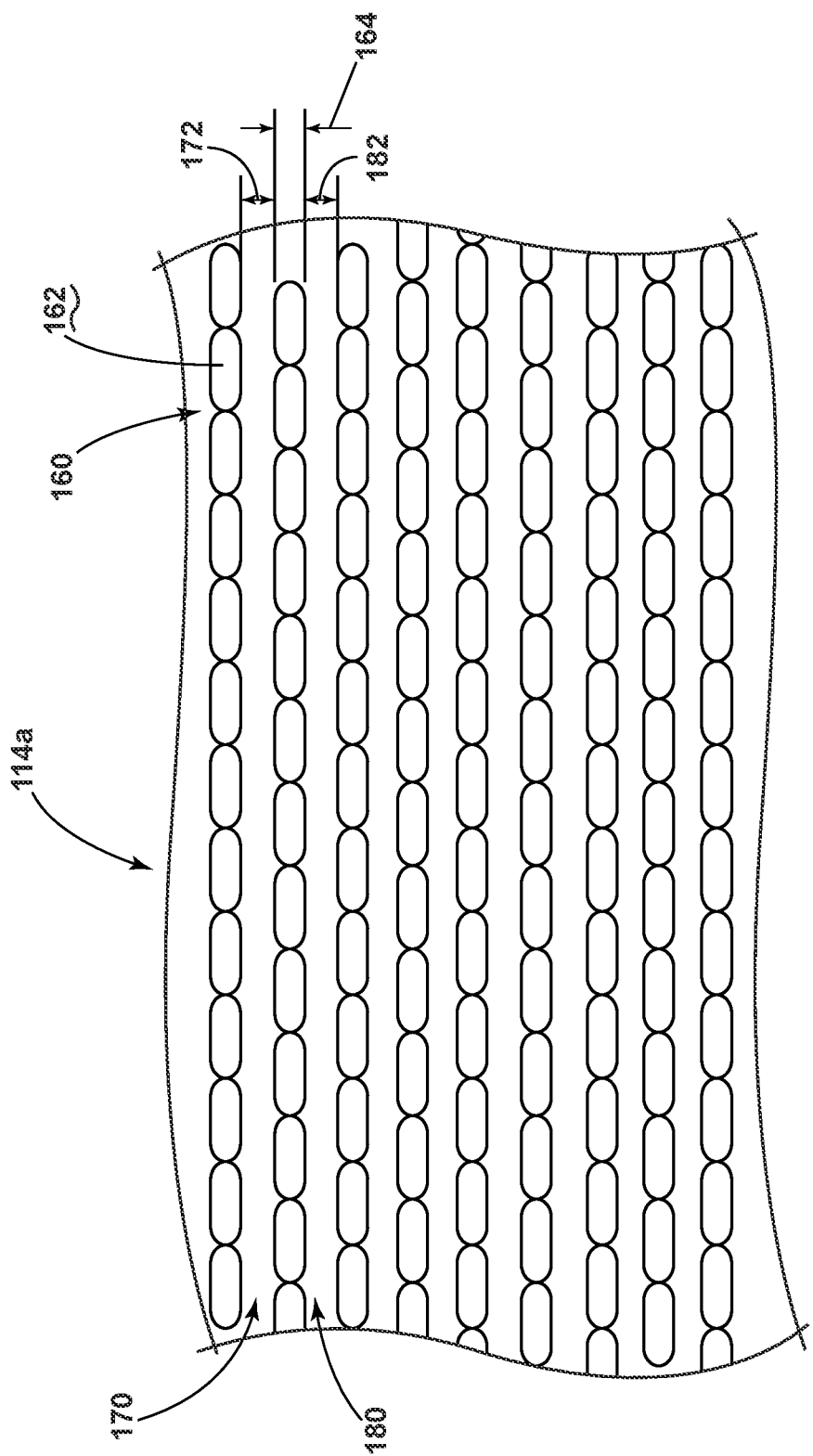
FIG. 4 schematically illustrates, according to another aspect disclosed herein, voids defined by support structures.

FIG. 4 illustrates a top view of a pole 114a, according to another aspect disclosed herein. The pole 114a is substantially similar to the pole 14a. Therefore, like parts will be identified with like numerals increased by 100, with it being understood that the description of the like parts of the pole 14a applies to the pole 114a unless otherwise noted.

A set of support structures 160 are illustrated, by way of non-limiting example, as elliptical. Voids 162 defined by two adjacent support structures of the set of support structures 160 are similarly illustrated, by way of non-limiting example, as elliptical. Alternatively, the set of support structures 160 can be a diamond or any other regular or irregular shape or any shapes that can perform the equivalence. Similarly, voids 162 can have a shape that is a diamond, or any other regular or irregular shape or any shapes that can perform the equivalence. It is further contemplated that the set of support structures 160 can be a variety of shapes that can vary from support to support.

By way of non-limiting example, an intermediate axial length 164 of a set of support structures 160 can be 0.005 inches (0.127 millimeters) or less. A first axial length 172 of a first lamination 170 can be 0.030 inches (0.762 millimeters) or less. A second axial length 182 of a second lamination 180 can be 0.030 inches (0.762 millimeters) or less.

It is contemplated that the intermediate axial length 164 defined by the set of support structures 160 in the axial direction A can vary depending on design. While illustrated as very thin, it is also contemplated that the thickness, frequency of occurrence, and shape of the set of support structures 160 can also vary in any direction. Similarly, it is contemplated that the first lamination 170 or the second lamination 180 can have varying thickness and shape.

Figure 5:
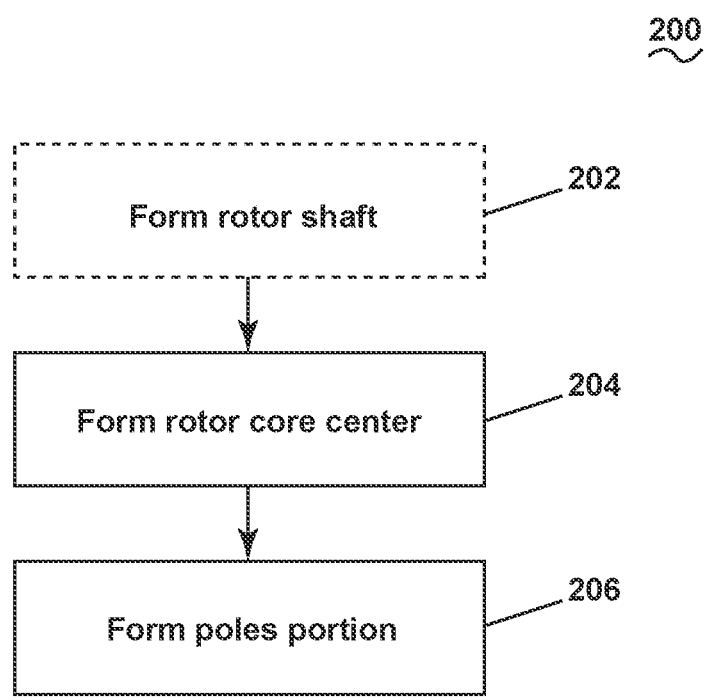
FIG. 5 illustrates a method for manufacturing a rotor for an electrical machine.

FIG. 5 depicts a flow chart diagram used to illustrate a method 200 for manufacturing the rotor assembly 10 for an electrical machine. Forming can, by way of non-limiting example, include one or more of casting, additive manufacturing, or electrical discharge machining (EDM). Additive manufacturing can, by way of non-limiting example, include rapid prototyping, selective laser sintering, or printing. Printing, by way of non-limiting example, can include direct metal laser melting.

Optionally, at 202, at least a portion of the rotor shaft 16 is formed. By way of non-limiting example, at least a portion of the rotor shaft 16 can be printed layer by layer until reaching a predetermined rotor shaft design or height. The printing of at least part of the rotor shaft 16, at 202, can occur prior to, concurrent with, or following any other formation of portions of the rotor assembly 10. It is contemplated that the first part 18 of the rotor shaft 16 can be printed of a steel alloy, such as a #4340 steel alloy containing at least one of nickel, chromium, or molybdenum. Other suitable materials can be used without deviating from the scope of the present disclosure.

At 204, a central portion of the rotor core 12 is formed. By way of non-limiting example, the rotor core 12 can be printed layer by layer until reaching a predetermined rotor core design, height, or radius. By way of non-limiting example, the predetermined rotor core design can include the printing, at 204, of the cooling tubes 54 as part of the rotor core 12. The cooling tubes 54 can be printed in each layer of the rotor core 12. It is contemplated, at 204, that the predetermined rotor core design can include printing a rotor shaft section for the rotor shaft 16 passing through the rotor core 12. In this manner, printing at 202 and 204 can occur simultaneously.

The rotor core 12 can be printed using, for instance, an iron-cobalt-vanadium soft magnetic alloy. Other suitable materials can be used without deviating from the scope of the present disclosure. Optionally, at 204, the printing of central portion of the rotor core 12 can include varnishing the rotor core 12.

At 206, pole portions of the rotor assembly 10 are formed spaced about the central portion of the rotor core 12. By way of non-limiting example, the plurality of poles 14 can be printed until reaching a predetermined plurality of poles design or height. The printing of the plurality of poles at 206 can occur prior to, concurrent with, or following the printing of the rotor core 12 at 204 or the printing of at least part of the rotor shaft 16 at 202. While the printing at 204 and at 206 have been shown sequentially it will be understood that they most likely will be printed simultaneously because the rotor core 12 and plurality of poles 14 are on the same printing plane.

A non-limiting example of a predetermined plurality of poles design can include each of the plurality of poles 14 having the pole body 20 extending in the radial direction R from the rotor core 12 towards the pole shoe 22. At least a portion of the pole shoe 22 or pole body 20 is printed using the quasi-laminations as described above. The quasi-laminations can be used to form the predetermined plurality of poles design that can include the teeth 40 and the gaps 42 that are formed in the pole shoe 22. Additionally, the quasi-laminations can be used to form the unitary structure 90 within at least a portion of the pole shoe 22 or pole body 20. The unitary structure 90 including the first lamination 70, the set of support structures 60, and the second lamination 80.

By way of non-limiting example, the quasi-laminations can include the first lamination 70. The first lamination 70 can be printed using laminate layers of uniformly dispensed material. The uniformly dispensed material laminate layers are printed or otherwise formed via additive manufacturing for the first axial length 72 to form the first laminate 70.

Once the first laminate 70 is formed, printing can continue to form the set of support structures 60 using laminate layers of non-uniformly dispensed material. The printing or otherwise forming via additive manufacturing of the set of support structures 60 can begin by the printing of the first arch 66. The first arch 66 can results from locations that receive material in the laminate layers of non-uniformly dispensed material. The first arch 66 is unitarily formed to the first lamination 70. Optionally, the first arch 66 can be approximately half of the intermediate axial length 64.

The second arch 68 is formed similarly, by adding laminate layers of non-uniformly dispensed material to the completed first arch 66. The first arch 66 and second arch 68 define the set of support structures 60 that span the intermediate axial length 64.

The voids 62 defined by the set of support structures 60, can be formed during quasi-lamination as locations that do not receive material in the laminate layers of non-uniformly dispensed material. Alternatively, the voids 62 defined by the set of support structures 60 can be formed in the quasi-laminations using EDM.

The second lamination 80 can be printed or otherwise formed via additive manufacturing to the set of support structures 60 as laminate layers of uniformly dispensed material that extend the second axial length 82.

Quasi-laminations allow the first lamination 70, the set of support structures 60, and the second lamination 80 to form the unitary structure 90. The unitary structure 90 formed using quasi-laminations can extend in the radial direction R through an entirety of the pole shoe 22 and a portion of the pole body 20.

Upon completion of this process, a distal end of the second lamination 80 can become the beginning of a new first lamination and the process can repeat itself until the desired length is achieved. In this manner, the unitary structure 90 can be formed from multiple layers of quasi-laminations with sets of support structures between the lamination "layers."

Alternatively, additional lamination layers and support structure layers can be printed in any desired pattern where a layer is not limited as only providing lamination or support structure. By way of non-limiting example, the first axial length 72 of the first lamination 70 can be greater than the second axial length 82 of the second lamination 80. Another non-limiting example can include an alternation in the shape of the set of support structures 60. That is, the unitary structure 90 can include both circular and elliptical shaped voids 62 defined by the set of support structures 60 or can be spaced or staggered in any suitable manner.

It is also contemplated that an insulating material can be printed into at least a portion of the void 63 or voids 62, 162. Additionally or alternatively, insulating material can be added to at least a portion of the void 63 or voids 62, 162 after one or more of the set of support structures 60 are formed, printed, or otherwise manufactured.

The plurality of poles 14 can be formed at 206 using, for instance, an iron-cobalt-vanadium soft magnetic alloy. Other suitable materials can be used without deviating from the scope of the present disclosure.

Additionally or alternatively, printing the plurality of the poles at 206 can include direct metal laser melting. Optionally, at 206, the printing of the plurality of poles 14 can include varnishing the plurality of poles 14.

The forming of the rotor core 12 at 204 or the forming of plurality of poles 14 at 206 can result in formation of the rotor slot 50 between each of the plurality of poles 14.

Those of ordinary skill in the art, using the disclosures provided herein, will understand that the method 200 disclosed herein can be adapted, expanded, modified, omitted, performed simultaneously, and/or rearranged in various ways without deviating from the scope of the present disclosure.

Aspects of the present disclosure provide for a variety of benefits. Traditional methods of forming metal laminates, such as rolling and stamping, have an inherent variance in laminate thickness such as ten percent, which can lead to non-uniform component lengths when stacks are formed from multiple laminates. The inclusion of the quasi-lamination can decrease variance. It is also contemplated that quasi-lamination can require less material than a design that includes uniform distribution of material in every laminate layer. This can provide cost or time savings in the manufacturing process.

Utilizing additive manufacturing methods, even multi-part components can be formed as a single piece of continuous metal, and can thus include fewer sub-components and/or joints compared to prior designs. The integral formation of these multi-part components through additive manufacturing can advantageously improve the overall assembly process. For example, the integral formation reduces the number of separate parts that must be assembled, thus reducing associated time and overall assembly costs. Additionally, existing issues with, for example, leakage, joint quality between separate parts, and overall performance can advantageously be reduced.

The additive manufacturing methods described herein enable much more complex and intricate shapes and contours of the components described herein. For example, such components can include quasi-laminations, which can include laminate layers connected by support structures. The successive, additive nature of the manufacturing process enables the construction of these novel features. As a result, the components described herein can exhibit improved performance and reliability.

While the gaps defined between the teeth of the pole shoe are known to help reduce eddy currents, the voids defined by support structures formed by using quasi-lamination further limit eddy currents. The design that includes both gaps and voids can reduce eddy current losses and reduce the sink effect during operation of an electrical machine for which the rotor core is utilized.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for manufacturing a rotor assembly for an electrical machine, the method comprising:
    forming a rotor core; and
    printing, using additive manufacturing, a plurality of poles, the plurality of poles spaced about the rotor core, each pole of the plurality of poles having a pole body extending from the rotor core towards a pole shoe defining a curved peripheral surface;
    wherein forming at least a portion of at least one of the plurality of poles comprises forming quasi-laminations that include:
    a first lamination extending along a first axial length;
    a second lamination extending along a second axial length, wherein the second axial length is spaced from the first axial length by an intermediate axial length; and
    a set of support structures between the first lamination and the second lamination that span the intermediate axial length and define a set of voids within the at least the portion of the at least one of the plurality of poles.

2. The method of claim 1 wherein at least one of the set of voids extends into the rotor core in a radial direction.

3. The method of claim 2 wherein each of the set of support structures are defined by a first arc and a second arc, wherein the first arc is unitarily formed in the first lamination and the second arc is unitarily formed to the first arc.

4. The method of claim 3 wherein location of the first arc and the second arc in the first lamination and the second lamination are locations that receive non-uniformly dispensed material.

5. The method of claim 4 wherein the first arc is half the intermediate axial length.

6. The method of claim 5 wherein the at least one of the set of voids is at least one of a circle or an ellipse.

7. The method of claim 2 wherein the at least one of the set of voids is at least one of a circle, an ellipse, or a diamond.

8. The method of claim 1 wherein the at least the portion of the at least one of the plurality of poles is a unitary structure formed by the quasi-laminations.

9. The method of claim 8 wherein the unitary structure of the first lamination, the second lamination, and the set of support structures extends radially through an entirety of the pole shoe.

10. The method of claim 1 wherein forming the set of support structures comprises printing, using additive manufacturing, supporting structures having a maximum of 0.005 inches (0.127 millimeters) in axial length or less and wherein the first lamination and the second lamination are 0.030 inches (0.762 millimeters) or less.

11. The method of claim 1 wherein forming the rotor core further comprises forming cooling tubes via direct metal laser melting, additive manufacturing, or electrical discharge machining as part of the rotor core.

12. A rotor assembly for an electric machine, comprising:
    a rotor core; and a plurality of poles, the plurality of poles spaced about the rotor core and unitarily formed with the rotor core by printing using additive manufacturing, each pole of the plurality of poles having a pole body extending from the rotor core towards a pole shoe defining a curved peripheral surface, wherein at least a portion of at least one of the pole shoe or the pole body comprises quasi-laminations that include a unitary structure, the unitary structure comprising:

a first lamination extending along a first axial length;

a second lamination extending along a second axial length wherein the second axial length is spaced from the first axial length by an intermediate axial length; and a set of support structures between the first lamination and the second lamination spanning the intermediate axial length and defining voids within the at least the portion of at least one of the pole shoe or the pole body.

13. The rotor assembly of claim 12 wherein at least one of the voids extends into the rotor core in a radial direction.

14. The rotor assembly of claim 13 wherein each of the set of support structures are defined by a first arc and a second arc, wherein the first arc is unitarily formed in the first lamination and the second arc is unitarily formed to the first arc.

15. The rotor assembly of claim 14 wherein location of the first arc and the second arc in the first lamination and the second lamination are locations that receive non-uniformly dispensed material.

16. The rotor assembly of claim 15 wherein the first arc is half the intermediate axial length.

17. The rotor assembly of claim 13 wherein the at least one of the voids is at least one of a circle, an ellipse, or a diamond.

18. The rotor assembly of claim 12 wherein the unitary structure of the first lamination, the second lamination, and the set of support structures extends radially through an entirety of the pole shoe.

19. The rotor assembly of claim 12 wherein forming the set of support structures comprises printing, using additive manufacturing, supporting structures having a maximum of 0.005 inches (0.127 millimeters) in axial length or less and wherein the first lamination and the second lamination are 0.030 inches (0.762 millimeters) or less.

20. The rotor assembly of claim 12 wherein forming the rotor core further comprises forming cooling tubes via direct metal laser melting, additive manufacturing, or electrical discharge machining as part of the rotor core.

* * * * *